United States Patent
Johnsen et al.

(10) Patent No.: US 10,063,544 B2
(45) Date of Patent: Aug. 28, 2018

(54) SYSTEM AND METHOD FOR SUPPORTING CONSISTENT HANDLING OF INTERNAL ID SPACES FOR DIFFERENT PARTITIONS IN AN INFINIBAND (IB) NETWORK

(75) Inventors: Bjorn-Dag Johnsen, Oslo (NO); Line Holen, Fetsund (NO); David Brean, Boston, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 497 days.

(21) Appl. No.: 13/488,088

(22) Filed: Jun. 4, 2012

(65) Prior Publication Data

US 2012/0311123 A1 Dec. 6, 2012

Related U.S. Application Data

(60) Provisional application No. 61/493,330, filed on Jun. 3, 2011.

(51) Int. Cl.
| | |
|---|---|
| *H04L 29/06* | (2006.01) |
| *H04L 9/32* | (2006.01) |
| *H04L 12/24* | (2006.01) |
| *H04L 12/931* | (2013.01) |

(52) U.S. Cl.
CPC ........ *H04L 63/0876* (2013.01); *H04L 9/3234* (2013.01); *H04L 9/3271* (2013.01); *H04L 41/12* (2013.01); *H04L 49/20* (2013.01); *H04L 63/0442* (2013.01); *H04L 63/083* (2013.01)

(58) Field of Classification Search
CPC .................. H04L 63/0442; H04L 63/083
See application file for complete search history.

(56) References Cited

U.S. PATENT DOCUMENTS

| | | | |
|---|---|---|---|
| 5,805,805 A | 9/1998 | Civanlar et al. | |
| 5,964,837 A | 10/1999 | Chao et al. | |
| 6,014,669 A | 1/2000 | Slaughter | |

(Continued)

FOREIGN PATENT DOCUMENTS

| | | |
|---|---|---|
| CN | 1728664 | 2/2006 |
| EP | 2 051 436 A1 | 4/2009 |

(Continued)

OTHER PUBLICATIONS

Tom Shanley et al., Infiniband Network Architecture, Pearson Education, published Oct. 2002 p. 83-87, 95-102, 205-208,403-406.*

(Continued)

*Primary Examiner* — Douglas B Blair
*Assistant Examiner* — Joseph M Cousins
(74) *Attorney, Agent, or Firm* — Tucker Ellis LLP

(57) ABSTRACT

A system and method can support consistent handling of internal ID space for different partitions in an InfiniBand (IB) network. A plurality of partitions can be provided for a subnet with a plurality of hosts, wherein each partition of the subnet includes one or more hosts and each host can be associated with one or more physical HCA instances. Each partition in the subnet can be associated with a separate internal ID space, and a single physical HCA instance is prevented from being shared by different tenants that use a same internal ID value in different partitions.

19 Claims, 3 Drawing Sheets

(56) References Cited

U.S. PATENT DOCUMENTS

| | | | |
|---|---|---|---|
| 6,091,706 A | 7/2000 | Shaffer | |
| 6,202,067 B1 | 3/2001 | Blood | |
| 6,463,470 B1 | 10/2002 | Mohaban et al. | |
| 6,594,759 B1 | 7/2003 | Wang | |
| 6,629,145 B1 | 9/2003 | Pham | |
| 6,647,419 B1 | 11/2003 | Mogul | |
| 6,678,835 B1 | 1/2004 | Shah et al. | |
| 6,748,429 B1 | 6/2004 | Talluri et al. | |
| 6,829,685 B2 | 12/2004 | Neal et al. | |
| 6,904,545 B1 | 6/2005 | Erimli et al. | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1 | 12/2005 | Frazier et al. | |
| 6,985,956 B2 | 1/2006 | Luke et al. | |
| 7,023,811 B2 | 4/2006 | Pinto | |
| 7,069,468 B1 | 6/2006 | Olson | |
| 7,113,995 B1 | 9/2006 | Beukema et al. | |
| 7,185,025 B2 | 2/2007 | Rosenstock et al. | |
| 7,194,540 B2 | 3/2007 | Aggarwal et al. | |
| 7,200,704 B2 | 4/2007 | Njoku et al. | |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,302,484 B1 | 11/2007 | Stapp et al. | |
| 7,356,841 B2 | 4/2008 | Wilson et al. | |
| 7,398,394 B1 | 7/2008 | Johnsen et al. | |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,633,955 B1 | 12/2009 | Saraiya et al. | |
| 7,634,608 B2 | 12/2009 | Droux | |
| 7,636,772 B1 | 12/2009 | Kirby | |
| 7,653,668 B1 | 1/2010 | Shelat | |
| 7,685,385 B1 | 3/2010 | Choudhary et al. | |
| 7,724,748 B2 | 5/2010 | Davis | |
| 7,783,788 B1 | 8/2010 | Quinn et al. | |
| 7,843,822 B1 | 11/2010 | Paul et al. | |
| 7,853,565 B1 | 12/2010 | Liskov | |
| 7,860,961 B1 | 12/2010 | Finkelstein et al. | |
| 7,873,711 B2 | 1/2011 | Adams et al. | |
| 7,953,890 B1 | 5/2011 | Katkar | |
| 8,184,555 B1 | 5/2012 | Mouton et al. | |
| 8,214,558 B1 | 7/2012 | Sokolov | |
| 8,214,653 B1 | 7/2012 | Marr | |
| 8,234,407 B2 | 7/2012 | Sugumar | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskiy et al. | |
| 8,583,921 B1 | 11/2013 | Shu | |
| 8,635,318 B1 | 1/2014 | Shankar | |
| 8,769,152 B2 | 7/2014 | Gentieu | |
| 8,924,952 B1 | 12/2014 | Hou | |
| 8,935,206 B2 | 1/2015 | Aguilera | |
| 8,935,333 B1 | 1/2015 | Beukema | |
| 8,972,966 B2 | 3/2015 | Kelso | |
| 9,130,858 B2 | 9/2015 | Bogdanski | |
| 9,172,602 B1 | 10/2015 | Dropps | |
| 2002/0059597 A1 | 5/2002 | Kikinis et al. | |
| 2002/0120720 A1 | 8/2002 | Moir | |
| 2002/0143914 A1 | 10/2002 | Cihula | |
| 2002/0188711 A1 | 12/2002 | Meyer et al. | |
| 2002/0198755 A1 | 12/2002 | Birkner | |
| 2003/0009487 A1 | 1/2003 | Prabakaran et al. | |
| 2003/0009551 A1 | 1/2003 | Benfield et al. | |
| 2003/0033427 A1 | 2/2003 | Brahmaroutu | |
| 2003/0079040 A1 | 4/2003 | Jain et al. | |
| 2003/0093509 A1 | 5/2003 | Li et al. | |
| 2003/0105903 A1 | 6/2003 | Garnett et al. | |
| 2003/0115276 A1 | 6/2003 | Flaherty | |
| 2003/0120852 A1 | 6/2003 | McConnell et al. | |
| 2003/0208572 A1 | 11/2003 | Shah et al. | |
| 2004/0022245 A1 | 2/2004 | Forbes et al. | |
| 2004/0022256 A1 | 2/2004 | Green | |
| 2004/0024905 A1 | 2/2004 | Liao | |
| 2004/0024911 A1 | 2/2004 | Chung | |
| 2004/0031052 A1 | 2/2004 | Wannamaker | |
| 2004/0068501 A1 | 4/2004 | McGoveran | |
| 2004/0090925 A1 | 5/2004 | Schoeberl | |
| 2004/0139083 A1 | 7/2004 | Hahn | |
| 2004/0153849 A1 | 8/2004 | Tucker et al. | |
| 2004/0162973 A1 | 8/2004 | Rothman | |
| 2004/0193768 A1 | 9/2004 | Carnevale | |
| 2004/0199764 A1 * | 10/2004 | Koechling | G06F 21/305 |
| | | | 713/155 |
| 2004/0220947 A1 | 11/2004 | Aman et al. | |
| 2004/0249928 A1 | 12/2004 | Jacobs et al. | |
| 2004/0255286 A1 | 12/2004 | Rothman | |
| 2005/0025520 A1 | 2/2005 | Murakami | |
| 2005/0044363 A1 | 2/2005 | Zimmer et al. | |
| 2005/0071382 A1 | 3/2005 | Rosenstock et al. | |
| 2005/0071709 A1 | 3/2005 | Rosenstock et al. | |
| 2005/0086342 A1 | 4/2005 | Burt | |
| 2005/0091396 A1 | 4/2005 | Nilakantan et al. | |
| 2005/0105554 A1 | 5/2005 | Kagan et al. | |
| 2005/0125520 A1 | 6/2005 | Hanson et al. | |
| 2005/0182701 A1 | 8/2005 | Cheston | |
| 2005/0182831 A1 | 8/2005 | Uchida et al. | |
| 2005/0182853 A1 | 8/2005 | Lewites et al. | |
| 2005/0198164 A1 | 9/2005 | Moore et al. | |
| 2005/0198250 A1 | 9/2005 | Wang | |
| 2005/0213608 A1 | 9/2005 | Modi | |
| 2005/0273641 A1 | 12/2005 | Sandven et al. | |
| 2006/0079278 A1 | 4/2006 | Ferguson et al. | |
| 2006/0112297 A1 | 5/2006 | Davidson | |
| 2006/0114863 A1 * | 6/2006 | Sanzgiri | H04L 63/1466 |
| | | | 370/338 |
| 2006/0168192 A1 | 7/2006 | Sharma | |
| 2006/0177103 A1 | 8/2006 | Hildreth | |
| 2006/0195560 A1 | 8/2006 | Newport | |
| 2006/0221975 A1 | 10/2006 | Lo et al. | |
| 2006/0233168 A1 | 10/2006 | Lewites et al. | |
| 2007/0016694 A1 | 1/2007 | Achler | |
| 2007/0050763 A1 | 3/2007 | Kagan | |
| 2007/0070959 A1 | 3/2007 | Almeroth | |
| 2007/0110245 A1 | 5/2007 | Sood et al. | |
| 2007/0129917 A1 | 6/2007 | Blevins | |
| 2007/0195774 A1 | 8/2007 | Sherman | |
| 2007/0195794 A1 | 8/2007 | Fujita et al. | |
| 2007/0206735 A1 | 9/2007 | Silver et al. | |
| 2007/0253328 A1 | 11/2007 | Harper et al. | |
| 2008/0031266 A1 | 2/2008 | Tallet et al. | |
| 2008/0144614 A1 | 6/2008 | Fisher et al. | |
| 2008/0159277 A1 | 7/2008 | Vobbilisetty et al. | |
| 2008/0183853 A1 | 7/2008 | Manion et al. | |
| 2008/0184332 A1 | 7/2008 | Gerkis | |
| 2008/0192750 A1 | 8/2008 | Ko et al. | |
| 2008/0201486 A1 | 8/2008 | Hsu et al. | |
| 2008/0209018 A1 * | 8/2008 | Hernandez et al. | 709/222 |
| 2008/0229096 A1 | 9/2008 | Alroy et al. | |
| 2008/0250125 A1 | 10/2008 | Brey et al. | |
| 2008/0288646 A1 | 11/2008 | Hasha | |
| 2008/0310421 A1 | 12/2008 | Teisberg | |
| 2008/0310422 A1 | 12/2008 | Booth et al. | |
| 2009/0049164 A1 | 2/2009 | Mizuno | |
| 2009/0116404 A1 | 5/2009 | Mahop et al. | |
| 2009/0178033 A1 | 7/2009 | Challener | |
| 2009/0216853 A1 | 8/2009 | Burrow et al. | |
| 2009/0249472 A1 | 10/2009 | Litvin | |
| 2009/0271472 A1 | 10/2009 | Scheifler | |
| 2009/0307499 A1 | 12/2009 | Senda | |
| 2009/0327462 A1 | 12/2009 | Adams et al. | |
| 2010/0014526 A1 | 1/2010 | Chavan | |
| 2010/0020806 A1 | 1/2010 | Vahdat et al. | |
| 2010/0080117 A1 | 4/2010 | Coronado et al. | |
| 2010/0082853 A1 | 4/2010 | Block et al. | |
| 2010/0114826 A1 | 5/2010 | Voutilainen | |
| 2010/0138532 A1 | 6/2010 | Glaeser et al. | |
| 2010/0142544 A1 | 6/2010 | Chapel et al. | |
| 2010/0166167 A1 | 7/2010 | Karimi-Cherkandi et al. | |

(56) References Cited

U.S. PATENT DOCUMENTS

| | | | |
|---|---|---|---|
| 2010/0235488 | A1 | 9/2010 | Sharma et al. |
| 2010/0268857 | A1 | 10/2010 | Bauman et al. |
| 2010/0306772 | A1 | 12/2010 | Arnold et al. |
| 2011/0022574 | A1 | 1/2011 | Hansen |
| 2011/0072206 | A1 | 3/2011 | Ross et al. |
| 2011/0110366 | A1 | 5/2011 | Moore et al. |
| 2011/0138082 | A1 | 6/2011 | Khatri |
| 2011/0138185 | A1 | 6/2011 | Ju et al. |
| 2011/0173302 | A1* | 7/2011 | Rider ............................ 709/220 |
| 2011/0179195 | A1 | 7/2011 | O'Mullan |
| 2011/0209202 | A1 | 8/2011 | Otranen |
| 2011/0222492 | A1 | 9/2011 | Borsella et al. |
| 2011/0264577 | A1 | 10/2011 | Winbom et al. |
| 2011/0283017 | A1* | 11/2011 | Alkhatib ............. H04L 12/4641 709/244 |
| 2011/0307886 | A1 | 12/2011 | Thanga |
| 2012/0005480 | A1 | 1/2012 | Batke et al. |
| 2012/0039331 | A1 | 2/2012 | Astigarraga et al. |
| 2012/0195417 | A1 | 8/2012 | Hua et al. |
| 2012/0239928 | A1 | 9/2012 | Judell |
| 2012/0290698 | A1 | 11/2012 | Alroy et al. |
| 2012/0311333 | A1 | 12/2012 | Johnsen et al. |
| 2013/0041969 | A1 | 2/2013 | Falco et al. |
| 2013/0046904 | A1 | 2/2013 | Hilland |
| 2013/0159865 | A1 | 6/2013 | Smith et al. |
| 2013/0179870 | A1 | 7/2013 | Kelso |
| 2013/0191548 | A1 | 7/2013 | Boddukuri et al. |
| 2013/0191622 | A1 | 7/2013 | Sasaki |
| 2013/0262613 | A1 | 10/2013 | Hefty |
| 2013/0294773 | A1 | 11/2013 | Fu |
| 2013/0301645 | A1 | 11/2013 | Bogdanski et al. |
| 2014/0095853 | A1 | 4/2014 | Sarangshar |
| 2014/0095876 | A1 | 4/2014 | Smith et al. |
| 2014/0211808 | A1 | 7/2014 | Koren |
| 2015/0244572 | A1 | 8/2015 | Johnsen |

FOREIGN PATENT DOCUMENTS

| | | |
|---|---|---|
| EP | 2160068 A1 | 3/2010 |
| JP | 2002-247089 | 8/2002 |
| JP | 2004-166263 | 6/2004 |
| JP | 1567827 | 2/2006 |
| JP | 2006157285 | 6/2006 |
| JP | 2007501563 | 1/2007 |
| JP | 2005-522774 | 7/2008 |
| JP | 2009510953 | 3/2009 |
| WO | 01/90838 A2 | 11/2001 |
| WO | 2008099479 | 8/2008 |
| WO | 2012037518 | 3/2012 |
| WO | WO2012167268 | 6/2012 |
| WO | WO2013009846 | 1/2013 |

OTHER PUBLICATIONS

Shanley, Tom, "Infiniband Network Architecture" (excerpt), Pearson Education, Copyright © 2002 by MindShare, Inc., published Oct. 2002, p. 204-209, 560-564.

European Patent Office, International Searching Authority, International Search Report and Written Opinion dated Sep. 12, 2012 for Application No. PCT/US2012/040775, 13 pages.

Tom Shanley, Infiniband Network Architecture (excerpt), chapter—Detailed Description of the Link Layer, Pearson Education, published 2002, p. 390-392, 485, 491-493, 537-539.

Aurelio Bermudez, On the InfiniBand Subnet Discovery Process, IEEE The Computer Society 2003, pp. 1-6.

Tom Shanley, Infiniband Network Architecture, Pearson Education 2002, p. 559, 561.

Shanley, Tom, Infiniband Network Architecture (excerpt), Pearson Education, published 2002, p. 209-211, 393-394, 551, 554.

International Search Report dated Sep. 23, 2013 for Application No. PCT/US2013/040639, 10 pages.

International Search Report dated Sep. 26, 2013 for Application No. PCT/US2013/040656, 10 pages.

Shanley, Tom, "Infiniband Network Architecture", Pearson Education, Copyright © 2002 by MindShare, Inc., published Oct. 2002 p. 387-394.

InfiniBand[SM] Trade Association, InfiniBand™ Architecture Specification, vol. 1, Release 1.2.1, Nov. 2007, pp. 1-1727.

Lee, M., Security Enhancement in Infiniband Architecture, IEEE, vol. 19, Apr. 2005, pp. 1-18.

V. Kashyap, "IP over InfiniBand (IpoIB) Architecture", Network Working Group RFC 4392, Apr. 2006, 22 pages, retrieved on Apr. 9, 2015 from: <http://www.ietf.org/rfc/rfc4392>.

European Patent Office, International Searching Authority, International Search Report and Written Opinion for International Application No. PCT/US2014/068832 dated May 20, 2015, 10 pages.

State Intellectual Property Office of the People's Republic of China dated May 5, 2015 for Chinese Patent Application No. 201180039850.7, 2 pages.

Search Report from State Intellectual Property Office of the People's Republic of China dated May 29, 2015 for Chinese Patent Application No. 201180040064.9, 1 page.

Search Report from State Intellectual Property Office of the People's Republic of China dated Jun. 3, 2015 for Chinese Patent Application No. 201180039807.0, 2 pages.

State Intellectual Property Office of the People's Republic of China, Search Report dated Sep. 9, 2015 for Chinese Patent Application No. 201280027279.1, 2 page.

United States Patent and Trademark Office, Office Action dated Jun. 3, 2016 for U.S. Appl. No. 13/235,187, 22 pages.

Shanley, Tom, "Infiniband Network Architecture" (Excerpt), Copyright 2002 by Mindshare, Inc., pp. 8-9, 391-396, 549-551.

United States Patent and Trademark Office, Notice of Allowance and Fee(s) Due dated Oct. 19, 2016 for U.S. Appl. No. 14/189,403, 6 Pages.

United States Patent and Trademark Office, Office Action dated Feb. 16, 2016 for U.S. Appl. No. 13/235,113, 21 Pages.

United States Patent and Trademark Office, Notice of Allowance and Fee(s) Due dated Mar. 31, 2016 for U.S. Appl. No. 14/189,442, 6 pages.

United States Patent and Trademark Office, Office Action dated Apr. 8, 2016 for U.S. Appl. No. 13/235,130, 32 Pages.

United States Patent and Trademark Office, Office Action dated Apr. 8, 2016 for U.S. Appl. No. 13/235,161, 24 Pages.

United States Patent and Trademark Office, Office Action dated May 6, 2016 for U.S. Appl. No. 13/488,192, 14 Pages.

Shanley, Tom, "Infiniband Network Architecture" (Excerpt), Copyright 2002 by Mindshare, Inc., p. 86-87.

Tom Shanley, Infiniband Network Architecture (excerpt), Pearson Education, Published 2002, p. 213.

United States Patent and Trademark Office, Office Action dated Apr. 18, 2017 for U.S. Appl. No. 13/235,113, 30 Pages.

United States Patent and Trademark Office, Office Action dated Jun. 15, 2017 for U.S. Appl. No. 13/488,113, 22 Pages.

Shanley, Tom "Infiniband Network Architecture" Copyright 2002 by Mindshare, Inc., ISBN: 0-321-11765-4, pp. 117-123 and 629-633.

European Patent Office, Communication Pursuant to Article 94(3) EPC, dated Mar. 8, 2017 =or European Patent Application No. 11767106.5, 10 Pages.

Ching-Min Lin et al., "A New Quorum-Based Scheme for Managing Replicated Data in Distributed Systems" IEEE Transactions on Computers, vol. 51, No. 12, p. 1442-1447, Dec. 2002.

* cited by examiner

US 10,063,544 B2

SYSTEM AND METHOD FOR SUPPORTING CONSISTENT HANDLING OF INTERNAL ID SPACES FOR DIFFERENT PARTITIONS IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent application Ser. No. 13/487,973 filed Jun. 4, 2012, entitled "SYSTEM AND METHOD FOR PROVIDING SECURE SUBNET MANAGEMENT AGENT (SMA) IN AN INFINIBAND (IB) NETWORK", by inventors Bjørn Dag Johnsen, Ola Tørudbakken and David Brean.

U.S. patent application Ser. No. 13/488,040 filed Jun. 4, 2012, entitled "SYSTEM AND METHOD FOR AUTHENTICATING IDENTITY OF DISCOVERED COMPONENT IN AN INFINIBAND (IB) NETWORK", by inventors Bjørn Dag Johnsen, Predrag Hodoba and Ola Tørudbakken.

U.S. patent application Ser. No. 13/488,113 filed Jun. 4, 2012, entitled "SYSTEM AND METHOD FOR PROVIDING SOURCE ID SPOOF PROTECTION IN AN INFINIBAND (IB) NETWORK," filed by inventors Bjørn Dag Johnsen, Line Holen and David Brean.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can support consistent handling of internal ID space for different partitions in an InfiniBand (IB) network. A plurality of partitions can be provided for a subnet with a plurality of hosts, wherein each partition of the subnet includes one or more hosts and each host can be associated with one or more physical HCA instances. Each partition in the subnet can be associated with a separate internal ID space, and a single physical HCA instance is prevented from being shared by different tenants that use a same internal ID value in different partitions.

DETAILED DESCRIPTION

Described herein is a system and method that can support consistent handling of internal ID space for different partitions in an interconeted network, such as an InfiniBand (IB) network.

Figure 1:
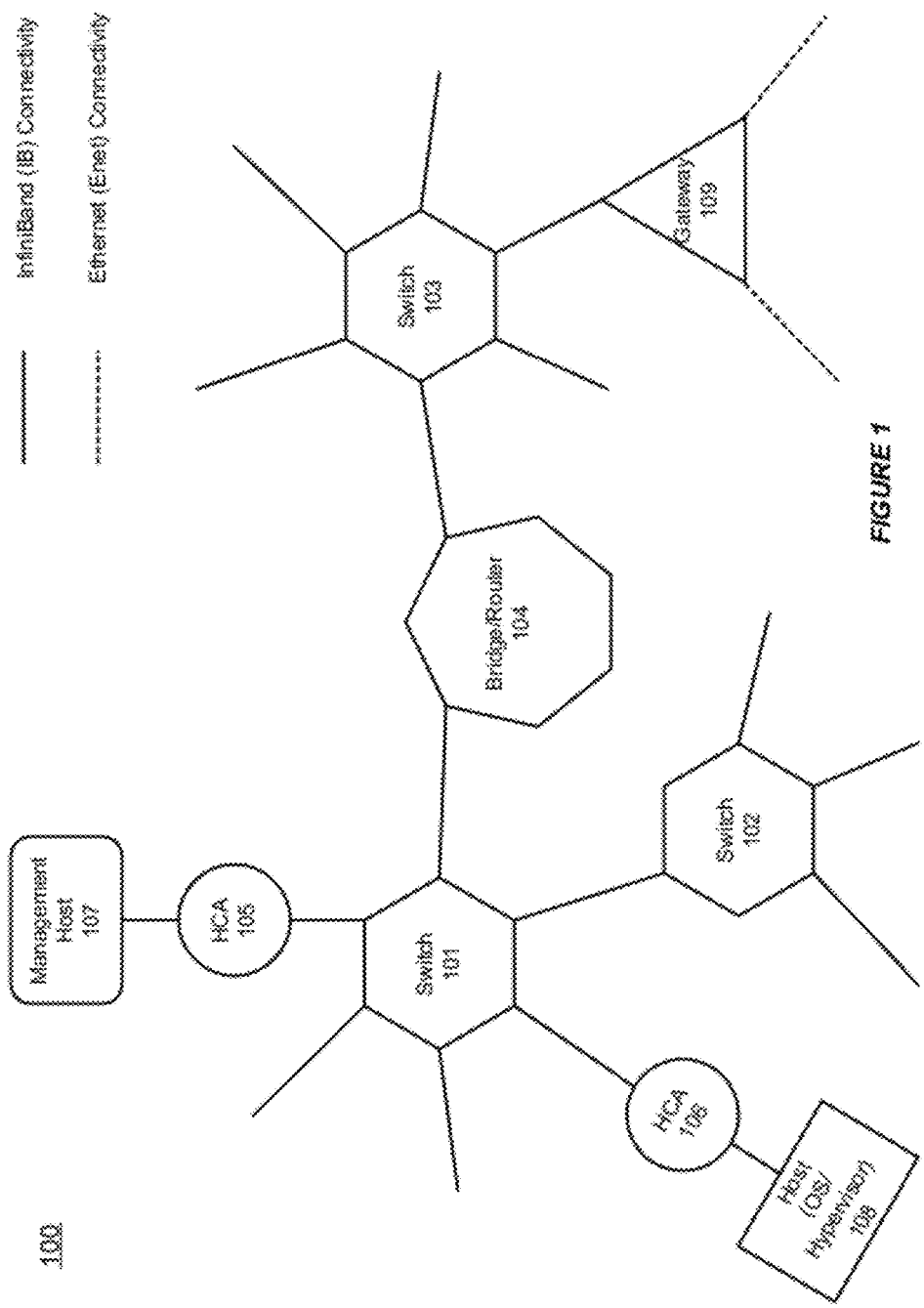
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105, 106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can only be indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the sub-net including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, .e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/ SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced virtual local area network (VLAN) control in Ethernet local area networks).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-) configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Single ID Space in Each IB Partition

In accordance with an embodiment of the invention, a single ID space can be supported in each partition in the IB fabric so that there can be name/address/ID space separation between different partitions, just like the Ethernet VLAN construct where each VLAN ID in principle represents a different Media Access Control (MAC) address space. The complete isolation for the exchange of information between tenants within a single subnet can be achieved based on the secure HCAs and completely independent partitions.

Figure 2:
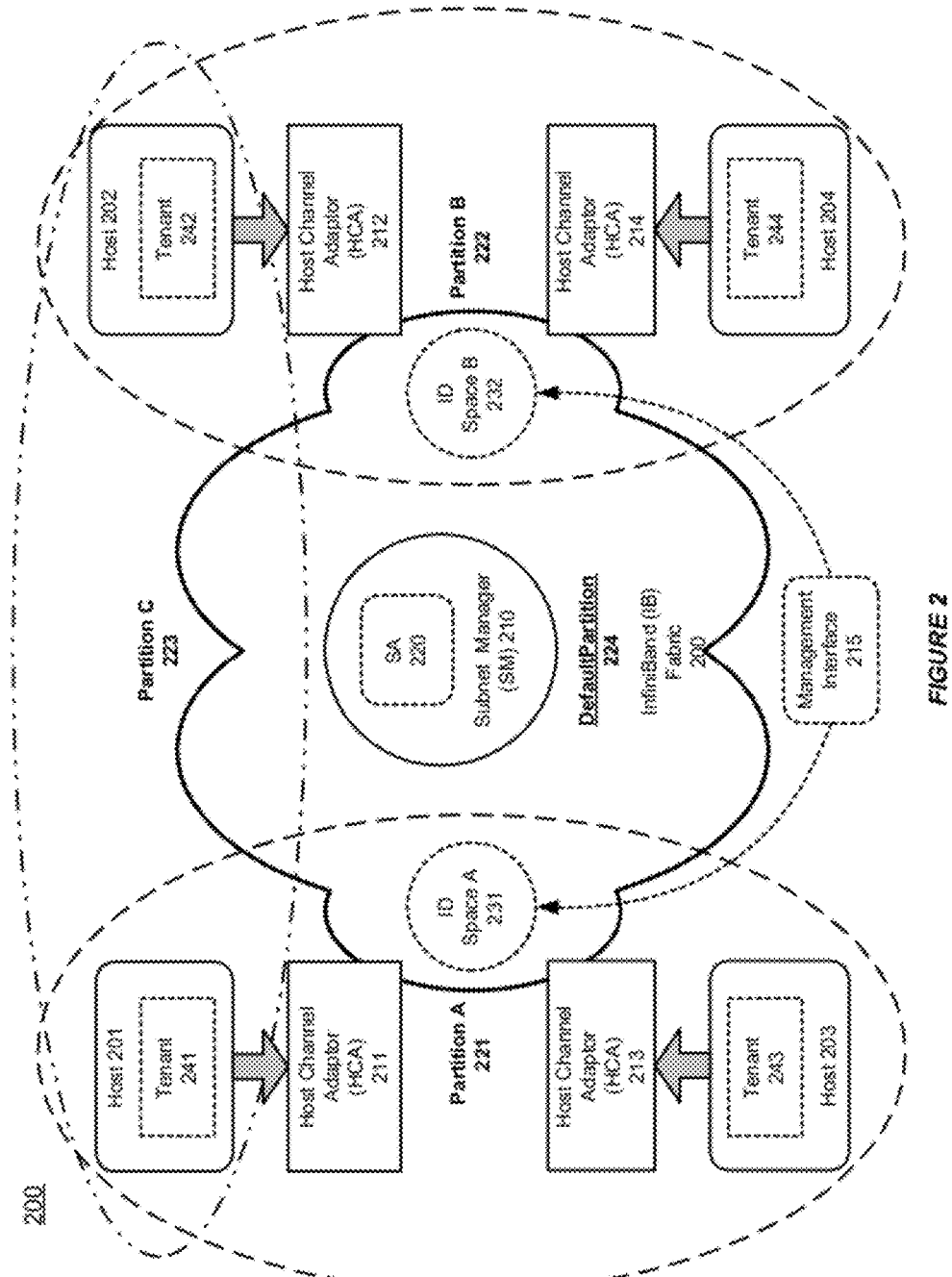
FIG. 2 shows an illustration of supporting consistent handling of internal ID space for different partitions in an IB fabric in accordance with an embodiment of the invention.

FIG. 2 shows an illustration of supporting consistent handling of internal ID space for different partitions in an IB fabric in accordance with an embodiment of the invention. As shown in FIG. 2, an IB fabric 200 can connect multiple hosts 201-204 and can support multiple partitions, e.g. partitions A-C 221-223. Here, partition A 221 can include host 201 and host 203, partition B 222 can include host 202 and host 204, and partition C 223 can include host 201 and host 202. Each host 201-204 can be connected to the fabric 200 through a HCA 211-214.

The IB fabric 200 allows different separate ID spaces to be associated with different partitions, or with a specific group of partitions. For example, partition A 221 is associated with an ID space A 231 and partition B 222 is associated with an ID space B 232. Furthermore, a SM 210 can allow a same ID value in different ID spaces 231-232 to be used by different tenants 241-244 in the different partitions 221-222.

Examples of these internal IDs can include the alias globally unique identifiers/virtual globally unique identifiers (alias GUIDs/vGUIDs) and the multicast group IDs (MCGIDs). For example, the IB fabric can support the reuse of same vGUID values for different physical ports in different partitions in order to allow vGUID handling to be consistent with how Enet MAC addresses can be reused in different VLANs.

Using a single internal ID space in each partition, the protocols and communication schemes that depend on these specific IDs, e.g. the MCGIDs used by Internet Protocol over InfiniBand (IPoIB), may be subject to temporary Denial of Service (DoS) conditions when the relevant ID is allocated, and thereby occupied, by unauthorized entities. Furthermore, in virtualized systems, the use of alias/virtual GUIDs can be subject to conflicting use of the same alias GUID. In both cases, these conflicts can arise even if there are no shared partitions between the involved nodes.

In accordance with an embodiment of the invention, in order to ensure that no "ID hijacking" can take place, a single physical HCA instance 211-214 may not be shared by two or more tenants 241-244 that use the same IDs in different partitions. Additionally, a higher level management interface 215 controlled by the site/fabric administrator can be used in order to control which IDs 231-232 are used by which physical servers and partitions.

Additionally, the IB fabric 200 can support one or more shared partitions, within which shared services are full members and clients from one or more tenants are limited members. For example, the default partition 224, which is a shared partition, can provide clients in different partitions 221-223 with access to a SA 220 instance, which is a shared service.

In accordance with an embodiment of the invention, different internal ID values, e.g. different multicast or unicast GIDs values that may be included in the global route headers (GRHs), can be used for different partitions on a same HCA (e.g. partition A 221 and partition C 223 may both use HCA 211), in order to ensure that the hardware implementation functions correctly. This is due to that the IB hardware implementation that handles the multicast and unicast packets with the GRHs may not support correlating the multicast or unicast GIDs included in the GRHs with different partitions.

While an HCA 211-214 can be shared by different partitions, the multicast or unicast GIDs may not be shared by different partitions that use overlapping ID value spaces. Thus, when multiple tenants use different partitions, the workloads from different tenants can either use different hosts (thereby use different HCAs) or use different HCAs on the same host. Furthermore, a workload provisioning system, or a human administrator that is aware of the tenant associations for different workloads and the constraints associated with the different tenants and the different partitions, can be used to implement the restrictions in the case of fully independent workloads that have no mutual communication.

Furthermore, a shared service can implement services for multiple clients from different tenants in shared partitions. The shared partitions can be used where clients are limited members and services are full members. In this case, the different shared partitions may not include any overlapping ID values that can cause any involved IB hardware to operate incorrectly. On the other hand, overlapping ID values are allowed where the correct ID to partition relationship can be defined or configured using software. Thus, the multicast ID values are preferably unique across multiple shared partitions implemented by the same HCA, while the unicast GUIDs associated with different client ports or different partitions can be correctly correlated with the correct client even when the GUID values are not unique.

In an IB fabric 200, the SA 220 can be a shared service within the default partition. When the incoming SA request packets from different clients have IB packet headers that represent the default partition 224 and overlapping source GUID values, the request payload can define the context to be a specific unique partition, and also the source physical port can be uniquely defined based on the source LID. The SA 220 can determine the correct scope as long as either the partition specified in the payload or the source LID is different. Also, since the SA 220 has full control of which partitions are valid for which ports in the IB subnet, the SA 220 can verify that partition numbers specified in the SA request payloads are valid for the relevant source port.

Additionally, shared services in multiple shared partitions can use different HCAs for different shared partitions that may have overlapping ID spaces. As a result, multiple hosts may need to be used for a single service when the number of shared partitions is larger than the number of HCAs for any such host.

Furthermore, IB address resolution and multicast group membership can depend on in-band access to the SA 220, which can be implemented as an integral part of the SM implementation 210. Therefore, it is possible for a rough or "runaway" node to cause DoS type effects for other nodes by producing an "unlimited" request rate, as long as the fabric buffering and the SA node receive buffering resources are shared between multiple requesting nodes.

The IB fabric 200 can prevent two or more nodes from establishing traffic patterns that may cause severe congestion scenarios and significant DOS type effects, by preventing different communication flows from sharing the fabric buffering resources. Furthermore, additional provisioning logic can ensure that traffic in different IB partitions use independent fabric buffer resources (such as VLs). However, the number of independent buffer resources and/or link resources may not scale up with the increase of the number of partitions.

In accordance with an embodiment of the invention, the IB fabric 200 can be configured to ensure complete traffic separation in different partitions 221-223 and support different service level agreements (SLAB) for both control and data traffic between different tenants 241-244 in different partitions 221-223. Fabric buffer resources, such as VLs, and routes in the fabric can be provisioned among different partitions 221-223 and different tenants 241-244. Furthermore, workloads for different tenants can also be provisioned onto physical compute, storage and external network (or gateway) resources in the fabric 200.

The communication for each tenant/system can be contained within a corresponding sub-set of the complete fabric topology, including the corresponding storage and external network resources. For example, the communication between different sets of hosts on a same leaf switch with a single switch chip, and the communication between non-overlapping sets of leaf-switches in an IB fabric configuration, can be completely independent since the single switch chip ensures a full crossbar feature. Furthermore, if shared services are used between the tenants, then separate fabric buffer resources (VLs) can be used for this communication in order to avoid impact on the tenant/system internal traffic.

For more complex topologies as well as more complex communication patterns between different components and sub-systems/sub-topologies, other advanced methods for handling allocation and adjustment of bandwidth can be implemented. These advanced methods can include both static and dynamic routing, static and dynamic SL/VL usage, as well as dynamic monitoring and handling of congestion conditions.

Figure 3:
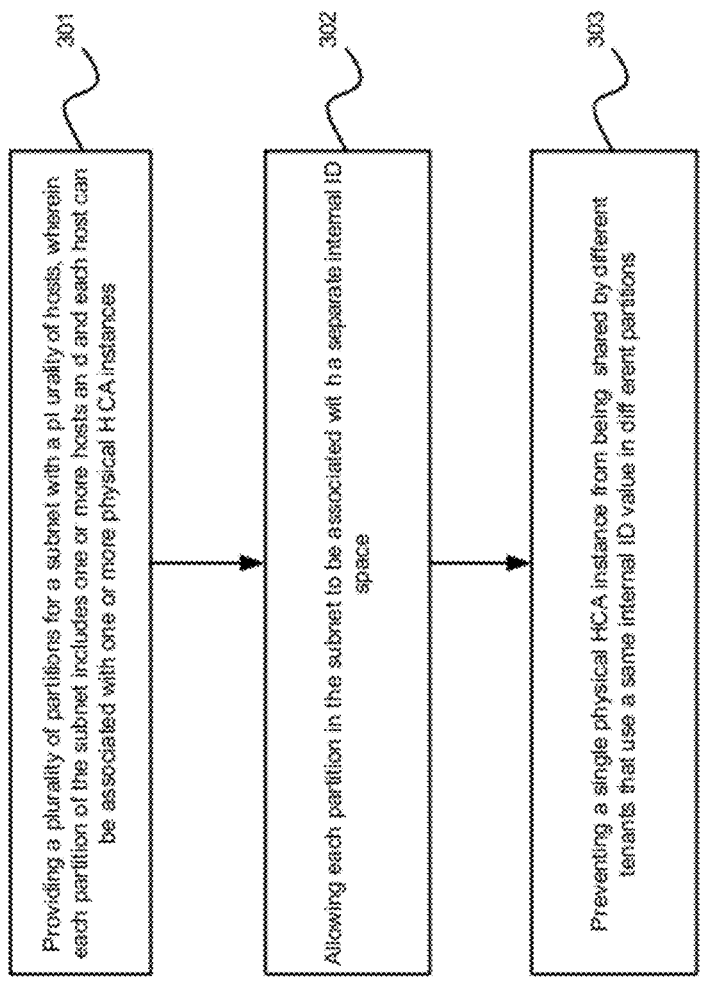
FIG. 3 illustrates an exemplary flow chart for supporting consistent handling of internal ID space for different partitions in an IB fabric in accordance with an embodiment of the invention.

FIG. 3 illustrates an exemplary flow chart for supporting consistent handling of internal ID space for different partitions in an IB fabric in accordance with an embodiment of the invention. As shown in FIG. 3, at step 301, a plurality of partitions can be provided for a subnet with a plurality of hosts, wherein each partition of the subnet includes one or more hosts and each host can be associated with one or more physical HCA instances. Then, at step 302, each partition in the subnet can be associated with a separate internal ID space. Finally, at step 303, a single physical HCA instance can be prevented from being shared by different tenants that use a same internal ID value in different partitions.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting consistent handling of internal ID space for different partitions in an InfiniBand (IB) network, comprising:
providing a subnet manager (SM) in a subnet of an interconnected IB network, wherein the subnet manager runs on one or more processors and the subnet includes a plurality of partitions and a plurality of hosts, wherein each partition of the subnet includes a plurality of hosts, each host is associated with a physical host channel adaptor (HCA), and each HCA has at least one physical port that connects the HCA to the subnet of the interconnected IB network, wherein the plurality of partitions includes a default partition that is a shared partition, and wherein each physical port of each HCA that is associated with each host of the plurality of hosts is a limited member of the default partition;

providing, as a shared service, a subnet administrator (SA) that is a subnet database associated with the SM and that stores information about the subnet;

including the SA shared service as a full member of the default partition;

associating, by the SM, a first partition of the plurality of partitions with a first identification space that is internal to the first partition and that contains a plurality of identifiers (IDs);

associating, by the SM, a second partition of the plurality of partitions with a second identification space that is internal to the second partition and that contains the plurality of IDs;

including, as a member of the first partition, a port of a first HCA associated with a one of the plurality of hosts included in the first partition;

including, as a member of the second partition, a port of a second HCA associated with a one of the plurality of hosts included in the second partition;

receiving, at the SA, a first request packet from the port of the first HCA associated with the one of the plurality of hosts included in the first partition, wherein the first request packet includes in a packet header section of the first request packet a first ID of the plurality of IDs and an identification of the default partition, and wherein the first request packet includes in a payload section of the first request packet an identification of the first partition;

using, by the SA, the identification of the first partition in the payload section of the first request packet and the first ID of the plurality of IDs in the packet header section of the first request packet to correlate the first ID to the port of the first HCA associated with the one of the plurality of hosts included in the first partition with regard to the first request packet;

receiving, at the SA, a second request packet from the port of the second HCA associated with the one of the plurality of hosts included in the second partition, wherein the second request packet includes in a packet header section of the second request packet the first ID of the plurality of IDs and an identification of the default partition, and wherein the second request packet includes in a payload section of the second request packet an identification of the second partition; and using, by the SA, the identification of the second partition in the payload section of the second request packet and the first ID of the plurality of IDs in the packet header section of the second request packet to correlate the first ID to the port of the second HCA associated with the one of the plurality of hosts included in the second partition with regard to the second request packet.

2. The method according to claim 1, further comprising: wherein the first ID is an alias/virtual GUID.

3. The method according to claim 1, further comprising: enabling reusing a same ID value of the plurality of ID values for different physical ports in different partitions in the subnet.

4. The method according to claim 1, further comprising: providing a management interface that controls which ID can be used by which physical servers and partitions.

5. The method according to claim 1, further comprising: enabling additional shared services that are full members of the shared default partition.

6. The method according to claim 5, further comprising: wherein each shared service is implemented with a different host.

7. The method according to claim 6, further comprising: wherein each host is associated with a separate HCAs.

8. The method according to claim 1, further comprising: provisioning and ensuring independent fabric buffer resources for different tenants in the fabric, and permitting traffic in different partitions to share buffer resources in the fabric.

9. The method of claim 1, wherein different tenants that are associated with a same ID of the plurality of IDs, and are associated with different partitions of the subnet, use separate HCAs.

10. A system for consistent handling of internal ID space for different partitions in an InfiniBand (IB) network, comprising:

one or more processors;

a subnet manager (SM) in a subnet of an interconnected IB network, wherein the subnet manager runs on the one or more processors and the subnet includes a plurality of partitions and a plurality of hosts, wherein each partition of the subnet includes a plurality of hosts, each host is associated with a physical host channel adaptor (HCA), and each HCA has at least one physical port that connects the HCA to the subnet of the interconnected IB network, wherein the plurality of partitions includes a default partition that is a shared partition, and wherein each physical port of each HCA that is associated with each host of the plurality of hosts is a limited member of the default partition;

a subnet administrator (SA) that runs on the one or more processors, that is a subnet database associated with the SM, that stores information about the subnet, that is provided as a shared service, and that is a full member of the default partition;

a first partition of the plurality of partitions that is associated with a first identification space that is internal to the first partition and that contains a plurality of identifiers (IDs);

a second partition of the plurality of partitions that is associated with a second identification space that is internal to the second partition and that contains the plurality of IDs;

a port of a first HCA associated with a one of the plurality of hosts included in the first partition, wherein the port of a first HCA associated with a one of the plurality of hosts included in the first partition is a member of the first partition;

a port of a second HCA associated with a one of the plurality of hosts included in the second partition, wherein the port of a second HCA associated with a one of the plurality of hosts included in the second partition is a member of the second partition;

wherein the SA operates to:
receive a first request packet from the port of the first HCA associated with the one of the plurality of hosts included in the first partition, wherein the first request packet includes in a packet header section of the first request packet a first ID of the plurality of IDs and an identification of the default partition, and wherein the first request packet includes in a payload section of the first request packet an identification of the first partition;

use the identification of the first partition in the payload section of the first request packet and the first ID of the plurality of IDs in the packet header section of the first request packet to correlate the first ID to the port of the first HCA associated with the one of the plurality of hosts included in the first partition with regard to the first request packet;

receive a second request packet from the port of the second HCA associated with the one of the plurality of hosts included in the second partition, wherein the second request packet includes in a packet header section of the second request packet the first ID of the plurality of IDs and an identification of the default partition, and wherein the second request packet includes in a payload section of the second request packet an identification of the second partition; and use the identification of the second partition in the payload section of the second request packet and the first ID of the plurality of IDs in the packet header section of the second request packet to correlate the first ID to the port of the second HCA associated with the one of the plurality of hosts included in the second partition with regard to the second request packet.

11. The system according to claim 10, wherein:
wherein the first ID is an alias/virtual GUID.

12. The system according to claim 10, wherein:
a same ID value of the plurality of ID values can be reused for different physical ports in different partitions in the subnet.

13. The system according to claim 10, further comprising:
a management interface that controls which ID can be used by which physical servers and partitions.

14. The system according to claim 10, wherein:
additional shared services are full members of the default shared partition.

15. The system according to claim 10, further comprising:
the SA is a single shared service for all hosts in different partitions in the subnet.

16. The system according to claim 14, wherein:
multiple hosts are used to implement the shared services in order to provide shared services implemented via separate HCAs.

17. The system of claim 10, wherein different tenants that are associated with a same ID of the plurality of IDs, and are associated with different partitions of the subnet, use separate HCAs.

18. A non-transitory machine readable storage medium having instructions stored thereon for supporting consistent handling of internal ID space for different partitions in an InfiniBand (IB) network, the instructions, when executed, cause a system to perform the steps of:

providing a subnet manager (SM) in a subnet of an interconnected IB network, wherein the subnet manager runs on one or more processors and the subnet includes a plurality of partitions and a plurality of hosts, wherein each partition of the subnet includes a plurality of hosts, each host is associated with a physical host channel adaptor (HCA), and each HCA has at least one physical port that connects the HCA to the subnet of the interconnected IB network, wherein the plurality of partitions includes a default partition that is a shared partition, and wherein each physical port of each HCA that is associated with each host of the plurality of hosts is a limited member of the default partition;

providing, as a shared service, a subnet administrator (SA) that is a subnet database associated with the SM and that stores information about the subnet;

including the SA shared service as a full member of the default partition;

associating, by the SM, a first partition of the plurality of partitions with a first identification space that is internal to the first partition and that contains a plurality of identifiers (IDs);

associating, by the SM, a second partition of the plurality of partitions with a second identification space that is internal to the second partition and that contains the plurality of IDs;

including, as a member of the first partition, a port of a first HCA associated with a one of the plurality of hosts included in the first partition;

including, as a member of the second partition, a port of a second HCA associated with a one of the plurality of hosts included in the second partition;

receiving, at the SA, a first request packet from the port of the first HCA associated with the one of the plurality of hosts included in the first partition, wherein the first request packet includes in a packet header section of the first request packet a first ID of the plurality of IDs and an identification of the default partition, and wherein the first request packet includes in a payload section of the first request packet an identification of the first partition;

using, by the SA, the identification of the first partition in the payload section of the first request packet and the first ID of the plurality of IDs in the packet header section of the first request packet to correlate the first ID to the port of the first HCA associated with the one of the plurality of hosts included in the first partition with regard to the first request packet;

receiving, at the SA, a second request packet from the port of the second HCA associated with the one of the plurality of hosts included in the second partition, wherein the second request packet includes in a packet header section of the second request packet the first ID of the plurality of IDs and an identification of the default partition, and wherein the second request packet includes in a payload section of the second request packet an identification of the second partition; and using, by the SA, the identification of the second partition in the payload section of the second request packet and the first ID of the plurality of IDs in the packet header section of the second request packet to correlate the first ID to the port of the second HCA associated with the one of the plurality of hosts included in the second partition with regard to the second request packet.

19. The non-transitory machine readable storage medium of claim 18, wherein different tenants that are associated with a same ID of the plurality of IDs, and are associated with different partitions of the subnet, use separate HCAs.

* * * * *

UNITED STATES PATENT AND TRADEMARK OFFICE
CERTIFICATE OF CORRECTION

PATENT NO. : 10,063,544 B2
APPLICATION NO. : 13/488088
DATED : August 28, 2018
INVENTOR(S) : Johnsen et al.

Page 1 of 1

It is certified that error appears in the above-identified patent and that said Letters Patent is hereby corrected as shown below:

On the Title Page

On page 3, Column 2, item (56) under Other Publications, Line 62, delete "=or" and insert -- FOR --, therefor.

In the Specification

In Column 1, Line 42, after "NETWORK,"" delete "filed".

In Column 1, Line 62, delete "Forschungszcntrum" and insert -- Forschungszentrum --, therefor.

In Column 2, Line 40, delete "interconeted" and insert -- interconnected --, therefor.

In Column 4, Line 31, delete ".e.g." and insert -- e.g., --, therefor.

In the Claims

In Column 9, Line 4, in Claim 1, delete "partition:" and insert -- partition; --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*